United States Patent [19]
Altes

[11] Patent Number: 6,088,295
[45] Date of Patent: Jul. 11, 2000

[54] FEATURE IMAGING AND ADAPTIVE FOCUSING FOR SYNTHETIC APERTURE PROCESSOR

[75] Inventor: Richard A. Altes, La Jolla, Calif.

[73] Assignee: The United States of America as represented by the Secretary of the Navy, Washington, D.C.

[21] Appl. No.: 09/222,635

[22] Filed: Dec. 29, 1998

[51] Int. Cl.[7] .............................. G01S 15/89; G01S 13/89
[52] U.S. Cl. ................................. 367/103; 367/7; 367/88; 342/25; 342/179
[58] Field of Search ............................... 367/87, 88, 100, 367/7, 103; 342/179, 195, 25

[56] References Cited

U.S. PATENT DOCUMENTS

| | | |
|---|---|---|
| 4,855,747 | 8/1989 | Steinberg .................................. 342/179 |
| 4,972,193 | 11/1990 | Rice . |
| 5,155,706 | 10/1992 | Haley et al. . |
| 5,214,744 | 5/1993 | Schweizer et al. . |
| 5,537,119 | 7/1996 | Poore, Jr. . |
| 5,555,532 | 9/1996 | Sacha . |
| 5,612,928 | 3/1997 | Haley et al. . |
| 5,793,701 | 8/1998 | Wright et al. ............................... 367/7 |
| 5,856,955 | 1/1999 | Cloe et al. .................................. 367/7 |

*Primary Examiner*—Ian J. Lobo
*Attorney, Agent, or Firm*—Harvey Fendelman; Michael A. Kagan; Eric James Whitesell

[57] ABSTRACT

A feature imaging and adaptive focusing synthetic aperture processing method provides improved sharpness and easier classification of images derived from radar and sonar echo data by applying adaptive focusing and feature imaging to a sequence of echo data.

4 Claims, 11 Drawing Sheets

$$\begin{bmatrix} \text{PITCH} \\ \text{ROLL} \\ \text{YAW} \\ (d/dt)\,\text{PITCH} \\ (d/dt)\,\text{ROLL} \\ (d/dt)\,\text{YAW} \end{bmatrix}_n = \begin{bmatrix} 1 & 0 & 0 & \Delta t & 0 & 0 \\ 0 & 1 & 0 & 0 & \Delta t & 0 \\ 0 & 0 & 1 & 0 & 0 & \Delta t \\ 0 & 0 & 0 & 1 & 0 & 0 \\ 0 & 0 & 0 & 0 & 1 & 0 \\ 0 & 0 & 0 & 0 & 0 & 1 \end{bmatrix} \times \begin{bmatrix} \text{PITCH} \\ \text{ROLL} \\ \text{YAW} \\ (d/dt)\,\text{PITCH} \\ (d/dt)\,\text{ROLL} \\ (d/dt)\,\text{YAW} \end{bmatrix}_{n-1}$$

FEATURE IMAGING AND ADAPTIVE FOCUSING FOR SYNTHETIC APERTURE PROCESSOR

BACKGROUND OF THE INVENTION

The present invention relates to detection and classification of sonar targets. More specifically, but without limitation thereto, the present invention relates to extracting and representing target and clutter information about stationary and moving objects from radar and sonar echo data.

Previous methods for processing sonar data use coherent processing and compensate for delay perturbations by correlating echoes or images obtained from different aspect angles and/or by adaptive focusing on relatively large point reflectors (reference points).

Coherent processing complicates the receiver and makes some of the feature images more difficult to obtain. For broadband signals, the envelope of a matched filter (or sharpened matched filter) is sufficiently narrow that only a few cycles of the carrier frequency are contained within the envelope. The resolution lost by using noncoherent processing (envelope detected sharpened matched filter outputs) instead of coherent processing (phase sensitive representation of the sharpened matched filter outputs) is minimal for signals with bandwidths that are nearly as large as their center frequencies.

Detection of weakly reflecting objects that are immersed in highly cluttered environments (e.g. buried in sand) using conventional images is almost impossible. A conventional image represents target reflectivity as a function of position on the image plane. To solve this problem, images other than a conventional representation of target reflectivity are required.

A conventional image becomes defocused by unpredictable motion because of the introduction of delay errors. Intuitively, it seems reasonable to correct for delay errors by using a correction that either yields high correlation between a new echo or image and previous images or maintains a sharp image of a relatively large reflector selected as a reference point. These approaches, although widely used, can be shown to be suboptimal by a simple example.

Figure 1:
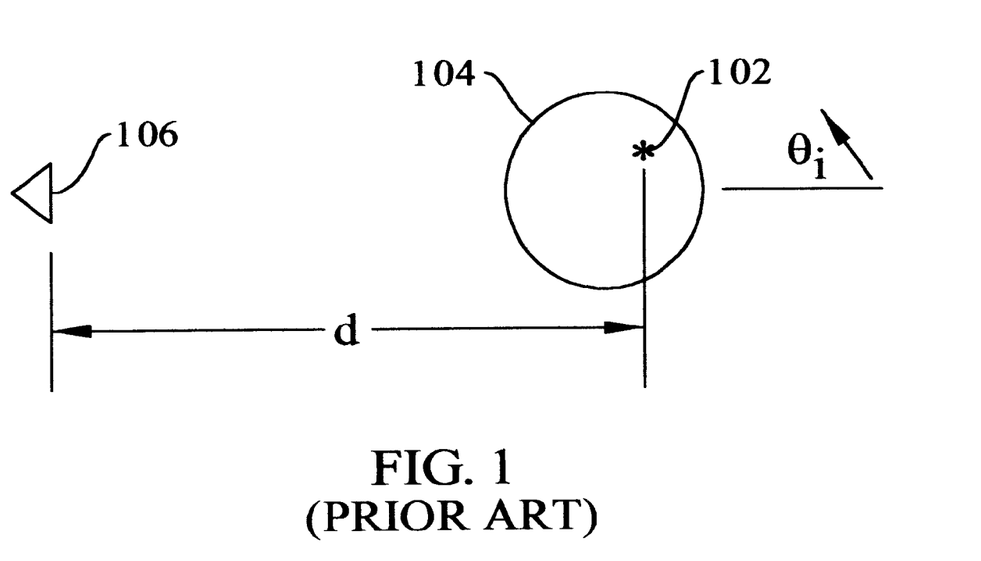
FIG. 1 is a diagram of a rotating target and a fixed sensor of the prior art.
Figure 2:
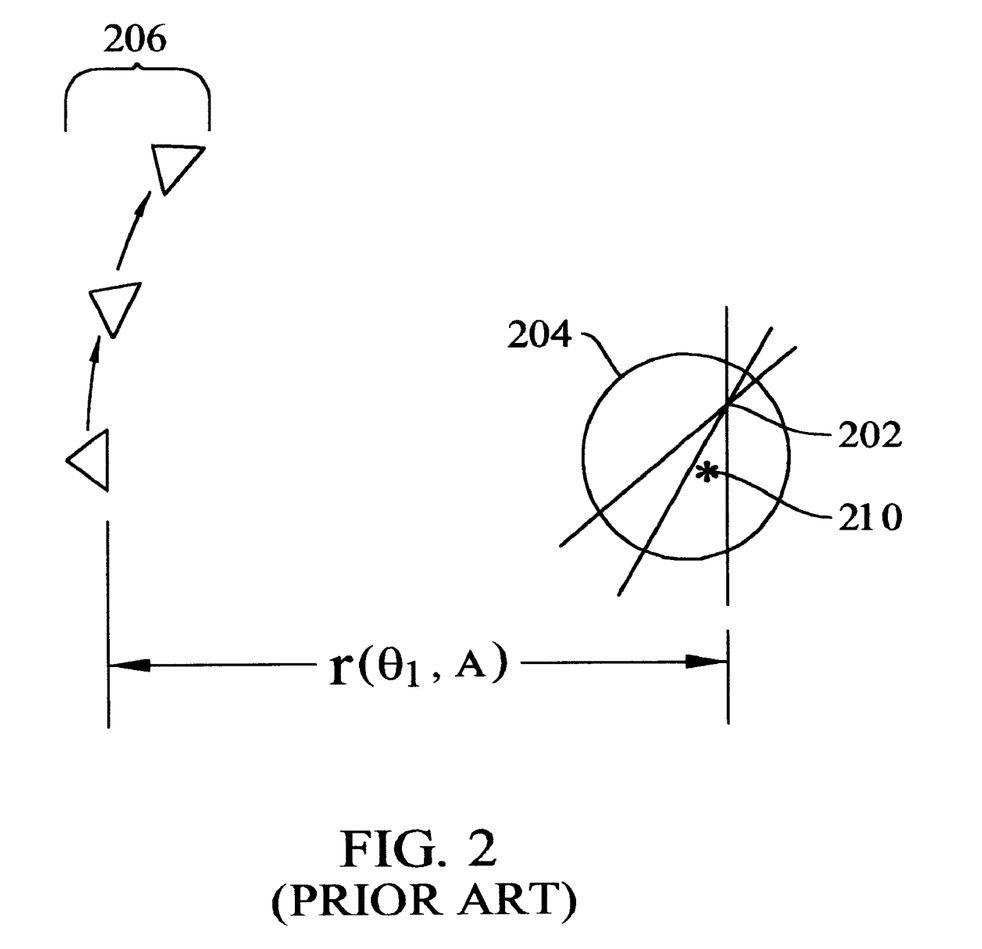
FIG. 2 is a diagram of a synthetic aperture delay-and-sum beamforming array.

In the synthetic aperture array of the prior art shown in FIGS. 1 and 2, an image of a point 102 on a rotating target 104 is obtained by summing echo samples arriving at sensor 106 that contain point 102 as target 104 rotates. The propagation delay over distance d must be compensated to add the appropriate echo sample to corresponding samples from other aspect angles in the predicted rotation of the actual target.

FIG. 2 shows the equivalent of FIG. 1 wherein a rotating sensor 206 rotates in an arc relative to stationary target 204. The sequence of equivalent sensor positions defines a synthetic aperture array. To sum the echo samples from point 202, the array is focused on point 202 by delay-and-sum beam forming. Intersecting line segments 208 represent different constant range surfaces in the far field of sensor 206. The length of each line segment 208 represents the beam width of the synthetic aperture array at the target location. At succeeding rotation angles, the largest image point is kept focused by rotating the target so that the same point is always closest to the sensor. The resulting image will be a line through the largest point rather than a circle (or a cylinder for a three dimensional system). This erroneous image will also have maximum correlation from echo to echo. The true image is formed without rotation "corrections". In this image, each point is represented by an asterisk as shown in FIG. 2, where the center point of the asterisk becomes much larger than the individual lines as the number of observation angles n becomes large. In this case, the ratio of the amplitude of the asterisk's central peak to the amplitude of each line equals n. Each image point is "smeared" by an asterisk-shaped point spread function with peak-to-sidelobe ratio equal to n. The point spread function becomes more and more like an impulse or point as the number of observations increases. The ideal point spread function is an impulse or point, since in this case the image is minimally smeared or defocused. A non-ideal point spread function results in a smeared or defocused image. Defocusing obscures information that would otherwise be available to a human or computational observer.

A need therefore exists for a better signal processing technique for representing features that are extracted from sonar data as images and for adaptive focusing of such images.

SUMMARY OF THE INVENTION

The present invention is directed to overcoming the problems described above, and may provide further related advantages. No embodiment of the present invention described herein shall preclude other embodiments or advantages that may exist or become obvious to those skilled in the art.

A feature imaging and adaptive focusing synthetic aperture array of the present invention comprises a delay-and-sum beamformer for finding delay corrections for an imaged target and environment. Adaptive focusing of the image is obtained by sequentially constructing a test image from feature images having the largest mean square bandwidth.

An advantage of the synthetic aperture feature imaging and adaptive focusing method of the present invention is that efficient use of computer memory may be achieved by the implementation of noncoherent processing and sequential imaging.

Another advantage is that a peak sharpness feature image may be used to accentuate clutter and suppress the target to detect targets otherwise undetectable. Targets with small reflectivity appear as voids in the clutter having distinctive shapes.

Yet another advantage is that mean square bandwidth may be used as a more reliable measure of best image than cross correlation of echoes and images.

The features and advantages summarized above in addition to other aspects of the present invention will become more apparent from the description, presented in conjunction with the following drawings.

DESCRIPTION OF THE INVENTION

The following description is presented solely for the purpose of disclosing how the present invention may be made and used. The scope of the invention is defined by the claims.

As explained above, a conventional image represents target reflectivity as a function of position on the image. A feature image is a generalization of a conventional image that represents descriptors other than reflectivity.

A useful feature image may be constructed using noncoherent processing to accentuate volume clutter and to suppress the target. Small scatterers such as bubbles are accentuated by a normalized peak sharpness measurement. At a given range value R, the largest echo peak is found in a small interval around R. The amplitude of the peak is normalized to unity, and the feature image represents the echo at R by its sharpness (the negative second derivative of the matched filter output at the peak). Normalizing the peak amplitude to unity removes dependence on reflectivity; tiny scatterers appear as intensely as large targets. The second derivative measure is equivalent to an ideal receiver for detection of Rayleigh scatterers (points that are small relative to the wavelength of the reflected signal). The sonar cross section of a Rayleigh scatterer varies as the fourth power of the signal frequency, and reflectivity varies as the square of the signal frequency. A frequency-squared filter is a double differentiator (multiplied by −1).

Figure 3:
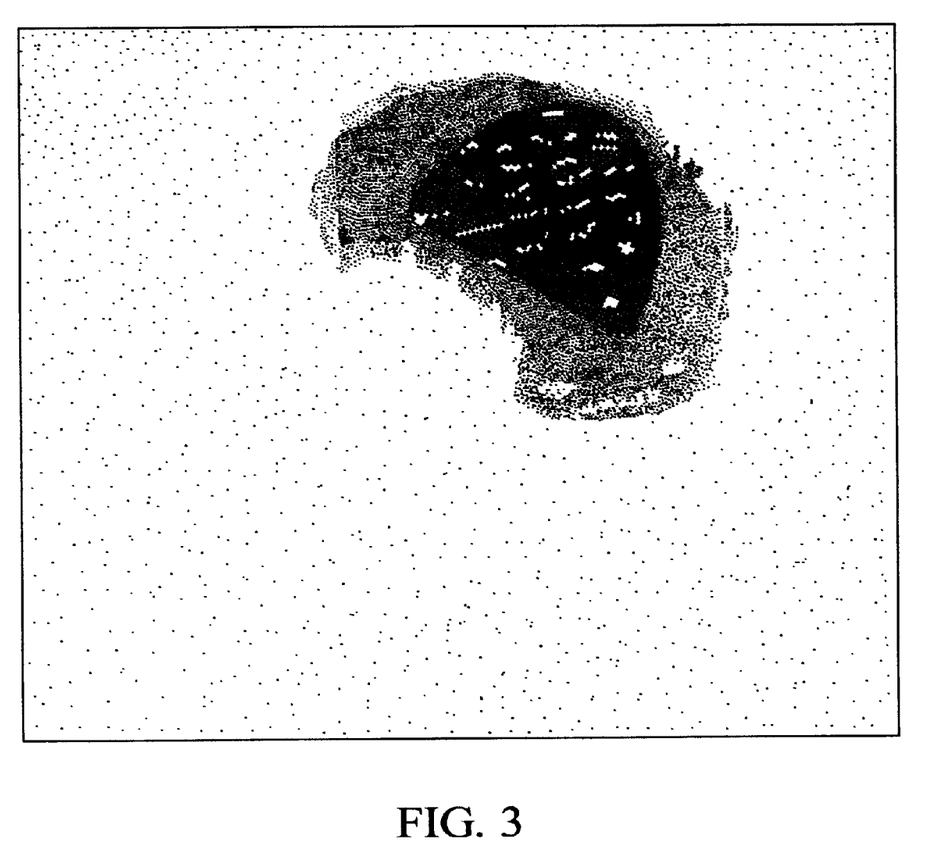
FIG. 3 is a noncoherent SAS (synthetic aperture sonar) conventional image of the prior art.
Figure 4:
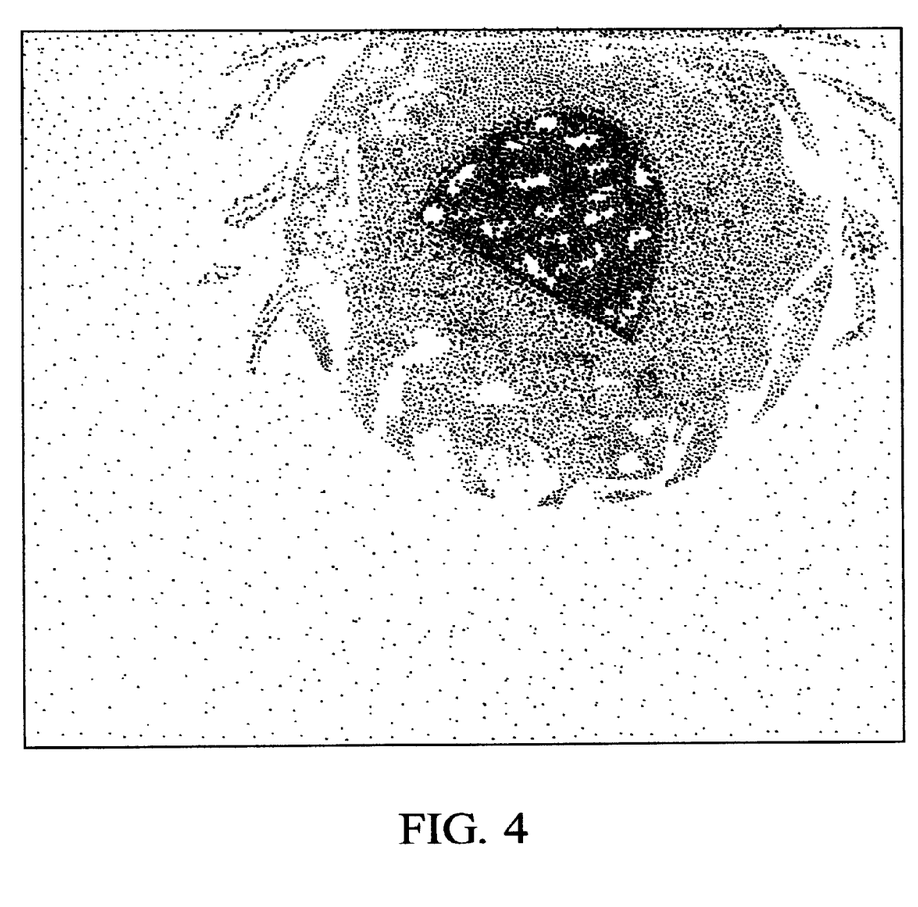
FIG. 4 is a feature image derived from the same echo data that is used to form the image in FIG. 3.
Figure 5:
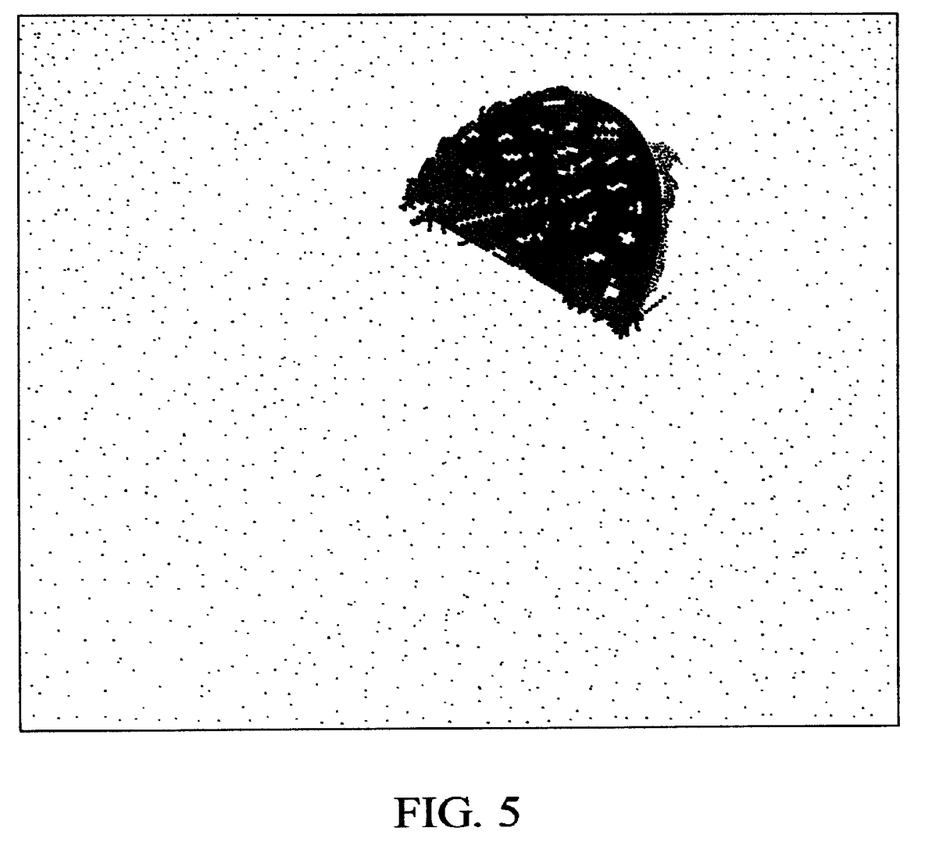
FIG. 5 is a target image obtained by subtracting the feature image of FIG. 4 from the conventional image of FIG. 3.

FIG. 3 is an illustration of a conventional image of echo data from a target surrounded by small particles and bubbles. FIG. 4 is a feature image of the second derivative measure of the same echo data. The signal-to-clutter ratio of the conventional image may be enhanced by subtracting the feature image from the conventional image, resulting in the sharper image illustrated in FIG. 5.

The predicted or expected propagation delays from point 102 on rotating target 104 to sensor 106 may be perturbed by target/sensor motion or by inhomogeneities in sound speed. In this case, an image may be formed by adaptively estimating the correct delays. Estimated corrections for the perturbations may be evaluated by comparing test images. For a delay-and-sum beamformer, the $n^{th}$ test image is preferably formed by adding delay-corrected samples of the $n^{th}$ echo to an image that has been sequentially constructed with previous echoes. Image bandwidth may be used as a focus measure for selecting the test image with the best delay/rotation correction. The final image is sequentially constructed from the best test images. The resulting image-based tracker may incorporate a dynamic model as in Kalman filtering and is similar to time warp compensation in speech classifiers. An image-based tracker can adaptively focus a synthetic aperture image, even when some parts of the image are moving relative to other parts.

Motion variability of a single point scatterer may be modeled as a distortion of the predicted range as a function of time. If the hypothesized delay history of echoes from the point scatterer is adaptively modified to match the distortion, the resulting motion compensation is equivalent to adaptive focusing with a multi-pulse matched filter. A similar distortion problem arises in speech recognition; a phoneme of speech data is often a time warped version of a reference function corresponding to the same phoneme. The problem of classifying the distorted phoneme has been solved by dynamic programming. This method is an efficient technique for sequential implementation of a likelihood function and is similar to the Viterbi algorithm for decoding communication signals.

The need for such efficiency may be appreciated by considering the number of different trajectories that are obtained from a simple three alternative model. The target delay (or the delay of a phoneme sample) at a given sampling time is the same as the predicted value or is slightly larger or smaller than the predicted value.

Figure 6:
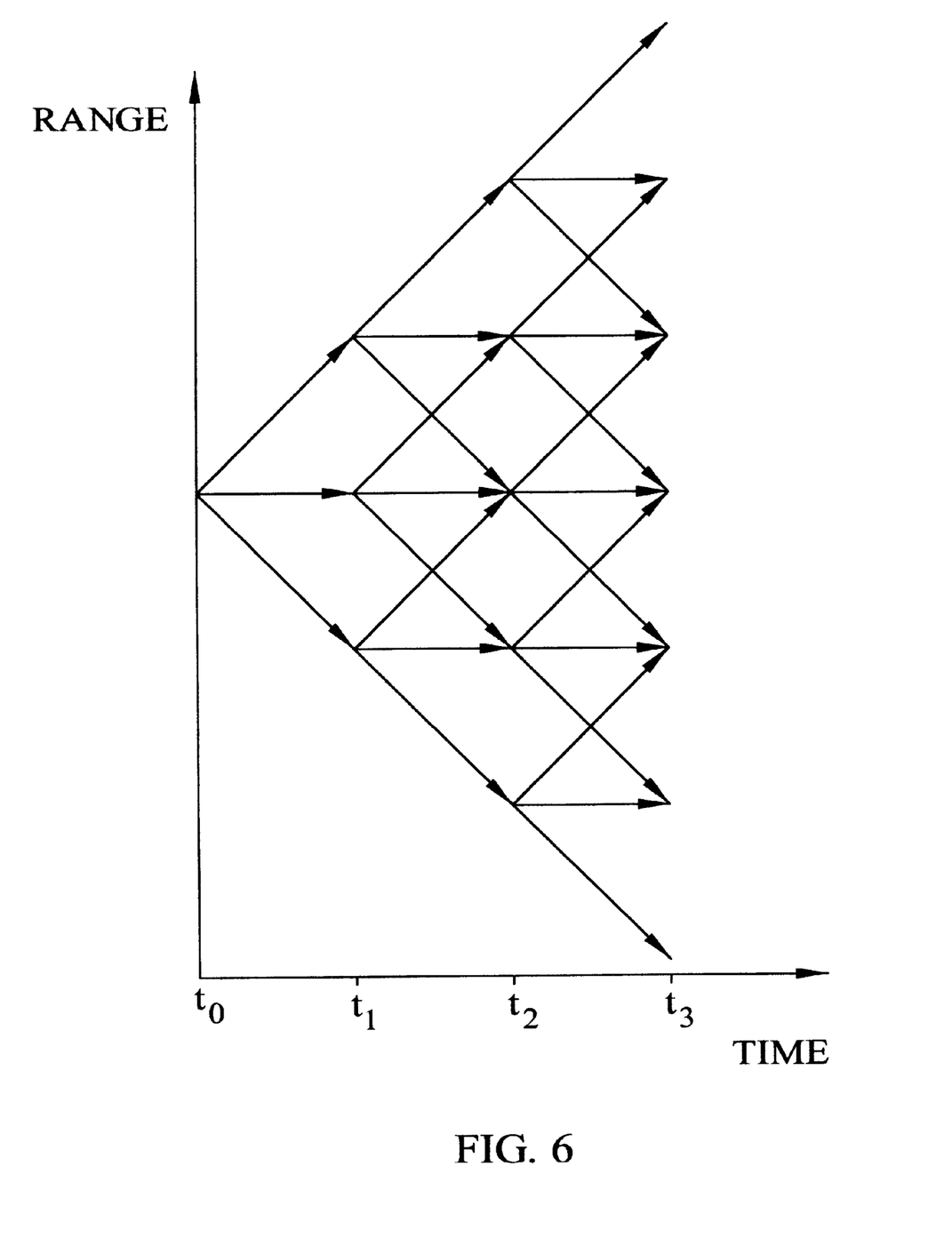
FIG. 6 shows the range vs. time diagrams for all possible trajectories, when three admissible perturbations of the predicted range occur at times $t_1$, $t_2$, $t_3$ for a single target.

FIG. 6 is a diagram illustrating three admissible trajectories at time $t_0$. Three different admissible trajectories or time warps exist between $t_0$ and $t_1$, nine between $t_0$ and $t_2$, and $3^n$ between $t_0$ and $t_n$. If a single point target is present, then the echo data may be correlated with many different sequences of delayed transmitted signals. The delay vs. time history of each sequence corresponds to a different admissible trajectory in FIG. 6. Computation of the maximum correlator response will result in a receiver that is focused on the isolated point scatterer, despite the unpredictable delay perturbations. Unfortunately, $3^n$ reference sequences are needed to compensate for all possible time warps after n time samples.

For focusing on an isolated point target, only the maximum cumulative correlator response is required at any given time, reducing the computational complexity of a correlation receiver that hypothesizes all admissible time warps. If each node in FIG. 6 at time $t_n$ is labeled with the maximum cumulative correlator response for all paths connecting to the node, then for a given node the maximum cumulative correlator response is the incremental increase in the corr-elator response for all nodes at the preceding time sample $t_{n-1}$ that are connected to the node. For an isolated point scatterer, the maximum cumulative correlator response at time $t_n$ denotes the best model for the perturbed trajectory up to that time. Since the perturbations are admissible distortions in the hypothesized range vs. time function for a moving point target, the maximum cumulative correlator response is proportional to the reflectivity of the point target.

The trajectory of the point target may be used to characterize the motion inferred by the adaptive focusing algorithm. The motion history may be estimated by tracing back from the node with the largest cumulative correlator response at time $t_{n-1}$. The trace-back is continued by finding the connected node with largest cumulative correlator response at time $t_{n-2}$, etc. The resulting range vs. time history may be differentiated and compared with a time-frequency representation.

Maximum cumulative correlator response is useful for an isolated point target, but the dynamic programming algorithm should not attempt to maximize cumulative correlator response for targets with multiple scattering points. The point target correlator response is an unreliable performance measure for adaptive focusing when the actual target is composed of multiple closely spaced reflectors. In the relative motion diagram of FIG. 7, for example, the reflectivity of point 702 is small compared to that of neighboring points. An algorithm that maximizes the cumulative correlator response to point 702 yields a smeared image; the apparent reflectivity of point 702 may be increased by smearing the edges of its neighbors. Conversely, a strongly reflective point may be ephemeral as the target rotates.

If the circular target in FIG. 1 is the projection of a rotating cylinder, then different area elements on the cylinder surface have maximum reflectivity as they become orthogonal to the propagation direction. The cumulative correlator response of a strongly reflective point may be maximized by assuming that the cylinder rotates along with synthetic array elements 206 in FIG. 2 so that the same area element is always orthogonal to the propagation direction. The resulting image is a flat plate rather than a cylinder. The maximum range amplitude or the largest correlator response to a single point is therefore an unreliable performance measure for adaptive focusing by delay/rotation compensation.

A more reliable performance measure is the peak-to-sidelobe ratio of the point spread function, because the peak-to-sidelobe ratio is maximized when the delay perturbations are correctly compensated. The point spread function is the sum of rotated constant-range surfaces in FIG. 2. The image of a point appears as an asterisk-shaped point spread function. Since the true image is modeled as a superposition of shifted points, the observed image is the true image (the target reflectivity distribution) convolved with the point spread function. The more impulse-like the point spread function, the better the delay compensation. Because the point spread function is convolved with the target reflectivity distribution, the Fourier transform of the point spread function is multiplied by the Fourier transform of the target reflectivity distribution.

Figure 7:
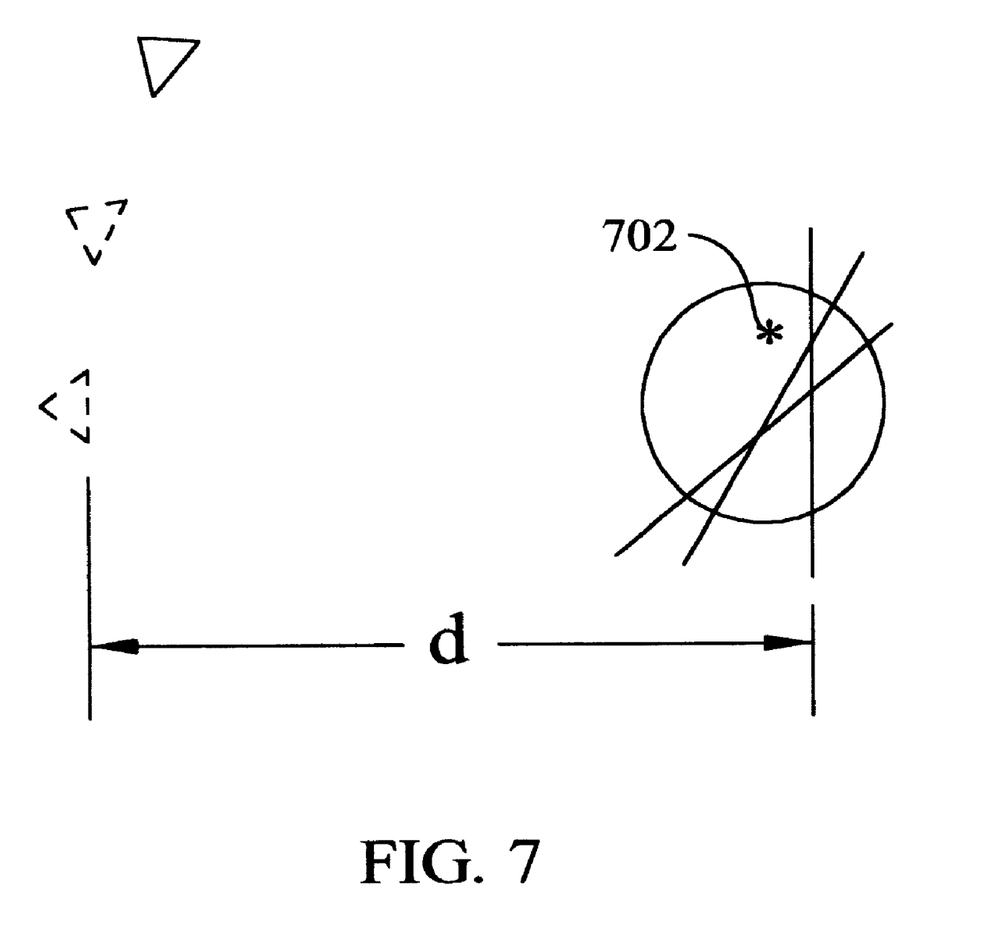
FIG. 7 is a diagram of a synthetic aperture delay-and-sum beamforming array illustrating inaccurate delays.

In the synthetic aperture array diagram of FIG. 7, the bandwidth of the point spread function is reduced if the point spread function is less similar to an impulse, and the bandwidth of the product of the Fourier transforms of the target distribution and the point spread function is reduced accordingly. A measure of the sharpness or peak-to-sidelobe ratio of the point spread function is then the mean square bandwidth of the image. If the latest delay in the delay-and-sum synthetic aperture beamformer is inaccurate, the echo sample that is added to the image of point 702 corresponds to target points along a constant range line that does not pass through point 702. When the delays are accurate, the superposition of constant range lines forms an asterisk-shaped point spread function having a peak-to-sidelobe (P/S) ratio equal to the number of observations (the number of array elements in the synthetic aperture). An inaccurate delay reduces the P/S ratio of the point spread function and causes extra smearing of the resulting image. The mean square bandwidth of a signal u(t) with a Fourier transform U(ω) may be expressed in one dimension as:

$$B_u = \int_{-\infty}^{\infty} |u'(t)|^2 dt \bigg/ \int_{-\infty}^{\infty} |u(t)|^2 dt = \int_{-\infty}^{\infty} \omega^2 |U(\omega)|^2 d\omega \bigg/ \int_{-\infty}^{\infty} |U(\omega)|^2 d\omega$$

and in two dimensions as:

$$B_u = \int_{-\infty}^{\infty}\int_{-\infty}^{\infty} [|\partial u(x,y)/\partial x|^2 + |\partial u(x,y)/\partial y|^2] dx dy \bigg/$$
$$\int_{-\infty}^{\infty}\int_{-\infty}^{\infty} |u(x,y)|^2 dx dy$$
$$= \int_{-\infty}^{\infty}\int_{-\infty}^{\infty} (\omega_x^2 + \omega_y^2) |U(\omega_x, \omega_y)|^2 d\omega_x d\omega_y \bigg/$$
$$\int_{-\infty}^{\infty}\int_{-\infty}^{\infty} |U(\omega_x, \omega_y)|^2 d\omega_x d\omega_y.$$

The image formation process is sequential, and each new sonar pulse adds another increment to each pixel. The image after n pulses is the target reflectivity distribution convolved with an asterisk-shaped point spread function with P/S level equal to n. As the P/S level increases, the image becomes less smeared, and the mean square bandwidth increases. The sharpness measure is therefore expected to increase monotonically with n. A dynamic programming solution to the delay perturbation problem can use a mean square bandwidth measure to represent the efficacy of delay compensation, and trajectories of target points may be chosen to maximize the image sharpness measure.

Referring now to the trajectory tree of FIG. 4, assuming that the range at time $t_{n+1}$ is the same as the predicted range at time $t_n$ or is slightly larger or smaller than the prediction by a perturbation Δd, and that all points in a small area of the target have approximately the same range perturbation, three test images of the area may be constructed corresponding to range perturbations of zero, plus Δd, or minus Δd. Each test image consists of the cumulative image after n pulses plus an increment to each pixel value that depends upon echo sample n+1 at the assumed delay of the pixel. The test image with the largest focus measure corresponds to the best delay perturbation hypothesis. In terms of the asterisk-shaped point spread function, a correct range hypothesis adds a constant range line that intersects the center of the asterisk. An incorrect range hypothesis misses the center of the asterisk, as illustrated in the synthetic aperture array diagram of FIG. 7. The point spread function of the n+1$^{th}$ element delay-and-sum synthetic beamformer experiences a maximum increase in P/S ratio for a correct delay hypothesis. Assuming that the 2D target distribution is the same for all test images, the best test image is sharper (better focused) than the other test images, where a measure of sharpness or focus is the mean square bandwidth given by the formula above. The mean square bandwidth of the test images thereby provides a measure of the point spread function peak-to-sidelobe ratio for hypothesized delay corrections.

The size of a test image should be as large as possible to provide a reliable measure of mean square bandwidth. For maximum stability of the algorithm, the mean square bandwidth focus measure should be computed over the whole target. If the target is rigid (or behaves as though it were rigid over the observation interval), the delay perturbation at any target point may be computed from the overall range perturbation at the center of rotation and from perturbations of pitch, roll, and yaw, i.e., from unpredictable rotations about the three axes that pass through the target center. Instead of three test images corresponding to no change in predicted delay, an admissible delay increment and an admissible delay decrement, the algorithm must now compute 27 test images for each range hypothesis at the center of rotation, corresponding to all possible combinations of no change, an admissible increment, and an admissible decrement of the predicted pitch, roll, and yaw angles. If there are three range hypotheses at the center of rotation, corresponding to an increase, decrease, or no change in predicted translational motion, then a total of 81 test images would be required. In each image, different target points have different delay corrections. If the target is contained within a cube of volume pixels (voxels), then the hypothesized delay perturbation of each target point or voxel may be computed from the perturbations of pitch, roll, and yaw angles. Corrections to predicted pitch, roll, and yaw angles may be inferred from the test image with the largest mean square bandwidth.

In summary, a decision at each node in FIG. 6 may be obtained by computing (1) different test images of local areas corresponding to proposed local delay corrections or (2) test images of larger areas that presumably contain a rigid target, where different test images correspond to different rotation (roll, pitch, and yaw) corrections together with an overall delay (translation) correction.

The test image with the largest mean square bandwidth corresponds to the best local delay corrections, or the best proposed pitch, roll, yaw, and translation correction. This criterion is based on the assumption that the 2D target distribution is the same for all test images. The only difference between the test images is then the shape of the point spread function used to estimate them. The image after n echoes is sequentially constructed from the best test images for echoes 1, . . . , n.

Figure 8:
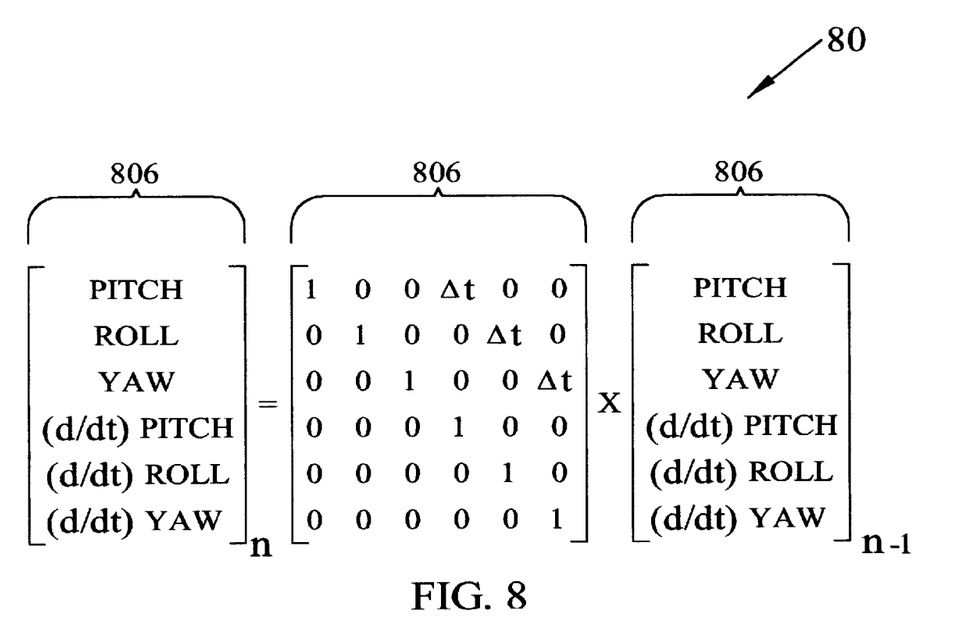
FIG. 8 is a state equation for delay perturbations in terms of pitch, roll, and yaw.

The interpretation of delay perturbations in terms of pitch, roll, and yaw is convenient because these angles may be used as state variables in a dynamic model that describes target behavior. FIG. 8 gives a version of the state equation 80 for delay perturbations in terms of pitch, roll, and yaw. Corrections to the predicted state vector are obtained from evaluating the mean square bandwidth of test images, and product vector 806 is used to predict the next observation. The dynamic model improves the prediction of individual pixel delays by computing these delays in the context of overall target motion. This formulation depends upon the assumption that all pixels in an image are part of a rigid target. Such an assumption may be inaccurate when a moving target is immersed in clutter.

Application of dynamic programming to speech recognition does not use a focus or P/S measure as in imaging. In speech recognition, admissible time warps are evaluated so as to maximize the correlation of time-warped data with each phoneme in a set of reference phonemes. A classifier picks the reference phoneme that has maximum correlation with admissibly time-warped data. This process may be applied to imaging by a combination of focusing with classification. Instead of using mean square bandwidth to evaluate test images that correspond to different proposed delay corrections, the test images are correlated with reference templates. The delay (or pitch, roll, and yaw) perturbation corresponding to the energy normalized test image that has the largest correlation with a given reference image is selected. A different sequence of admissible pitch, roll, and yaw corrections is obtained for each reference template. Each final, focused version of the image is correlated with the corresponding reference template. The correlation is used to classify the target and to identify the pitch, roll, and yaw corrections that best describe the maneuver that was performed by the target during the imaging process. This procedure is an extension of the basic imaging concept to the case where reference images are available.

The utilization of test image bandwidth to make a decision at each node in FIG. 4 assumes that the 2D target distribution in FIGS. 1, 2, and 7 is the same for each test image at a given aspect angle. This assumption is circumvented when the autofocus algorithm is given the freedom to make local adjustments to the predicted delay of each image point or of small areas of the image. For a 3D target, parts of the target will lie above and/or below the image plane that is determined by target rotation in FIG. 1. The freedom to adjust the predicted delay may be interpreted as the freedom to move outside the image plane in FIG. 1 by including elevation changes to compensate for unpredictable changes in the x,y position of each point as the target rotates. A sharpness measure such as mean square bandwidth might be increased by moving outside the designated image plane as well as by finding the best delays to maximize the peak-to-sidelobe ratio of the point spread function. The delay-corrected image will have large mean square bandwidth and will appear to be well focused, but it may not be identical to the 2D image that is formed without delay corrections, even when no corrections are needed.

Defocusing caused by inaccurate delays as illustrated by the synthetic aperture array of FIG. 7 may be tolerated to exploit an image on a different constant elevation plane that has particularly large bandwidth when observed from a new aspect angle. If this situation occurs, then the estimated delay of each point, considered by itself, becomes an unreliable indicator of target motion at the point. The relation between the delay perturbation of a point and target motion at the point is known provided that delay perturbations are contained in the plane of target rotation. The relation becomes inaccurate when the estimated delay has an unknown elevation component outside the plane of target rotation. This problem may be mitigated by using a 3D motion model with a rigid target as in FIG. 8 to hypothesize the delay of each point and to form the corresponding test images.

The adaptive focusing (image-based tracking) algorithm has been implemented to test wideband synthetic aperture sonar imaging for compensating for small excursions of the center of rotation (wobble) when a rotating target is suspended in lake water by thin lines. The signals and transducers are designed to emulate dolphin echolocation and have a frequency band between 50 kHz and 150 kHz. An image is sequentially constructed via delay-and-sum beamforming as in FIGS. 1 and 2. Different time-dependent delay corrections may be applied to different parts of the inverse synthetic aperture sonar (ISAS) image while the image is being formed. If the target rotates and the receiver is stationary as in FIG. 1, the system functions as an ISAS or an ISAR (ISA radar). If the receiver moves as in FIG. 2, the system functions as an SAS or SAR. Before the information from a new echo is incorporated into an image, a local focus metric (the mean square bandwidth of a local area) is used to evaluate a set of test images that are constructed using different hypothesized local delay perturbations. The test image (and thus the hypothesized delay) with the best local focus is chosen. The algorithm combines imaging and target tracking operations, yielding a focused image of an object despite unpredictable variations in the overall range to the center of rotation and in pitch, yaw, and roll angles. If a state variable model as in FIG. 8 is not used, positions of various parts of the object are tracked by assuming that delay corrections may be interpreted as delays in the original image plane.

Feature images may represent information other than target reflectivity as a function of position. A feature imaging technique for accentuating volume clutter (Rayleigh scatterers) and for detecting a low-reflectivity target by the shape of a void formed by the target within the clutter image includes identifying peaks or local maxima at the output of a whiten-and-match filter in a small delay interval around a selected range sample or pixel, normalizing each peak by dividing each peak sample by the maximum peak amplitude, finding an echo feature representation by estimating peak sharpness from the second derivative of the whiten-and-match filter output evaluated at the peak, replacing the original whiten-and-match filtered echo by the maximum normalized peak sharpness within each small delay interval, and constructing a noncoherent synthetic aperture image from the echo feature representation.

The operation of an exemplary feature imaging and adaptive focusing synthetic aperture processor 90 of the present invention as described above is shown in flow chart of FIG. 9.

Figure 9A:
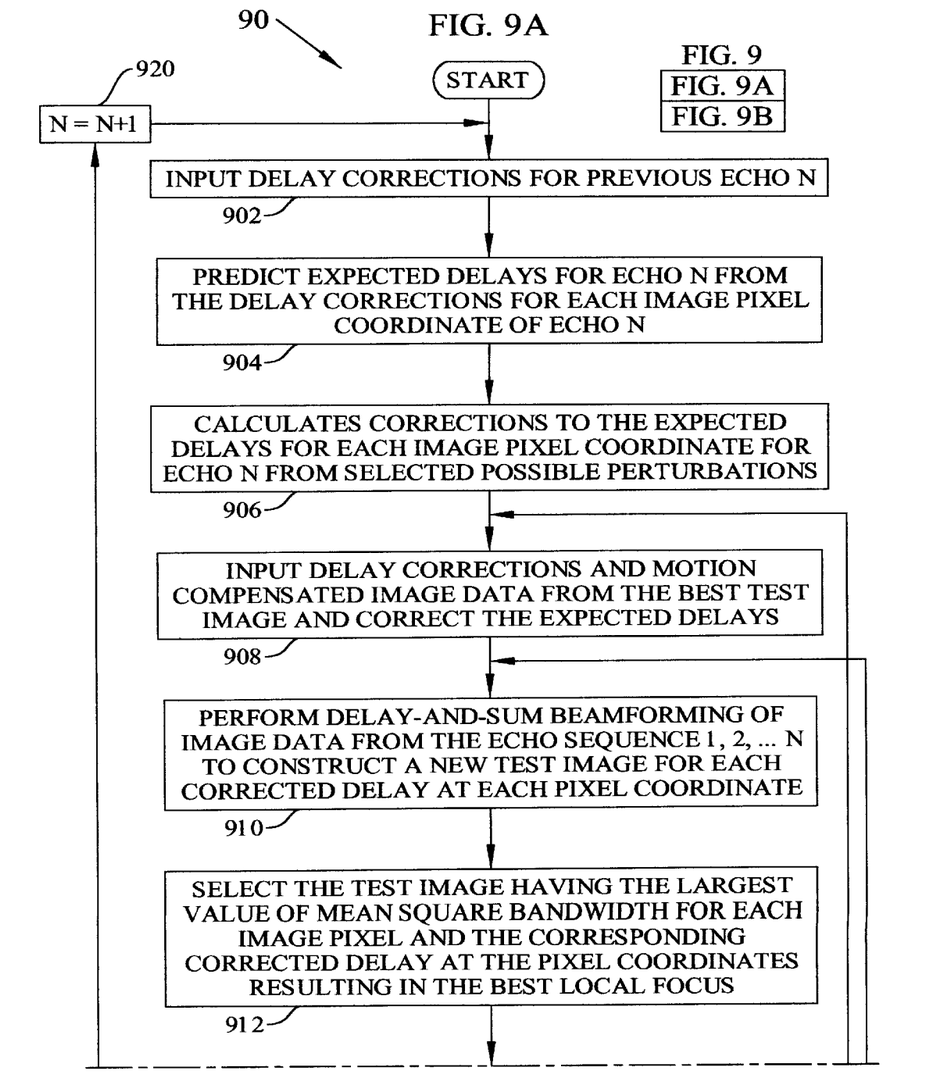
FIG. 9 is a flow diagram for a feature imaging and adaptive focusing synthetic aperture array of the present invention.
Figure 9B:
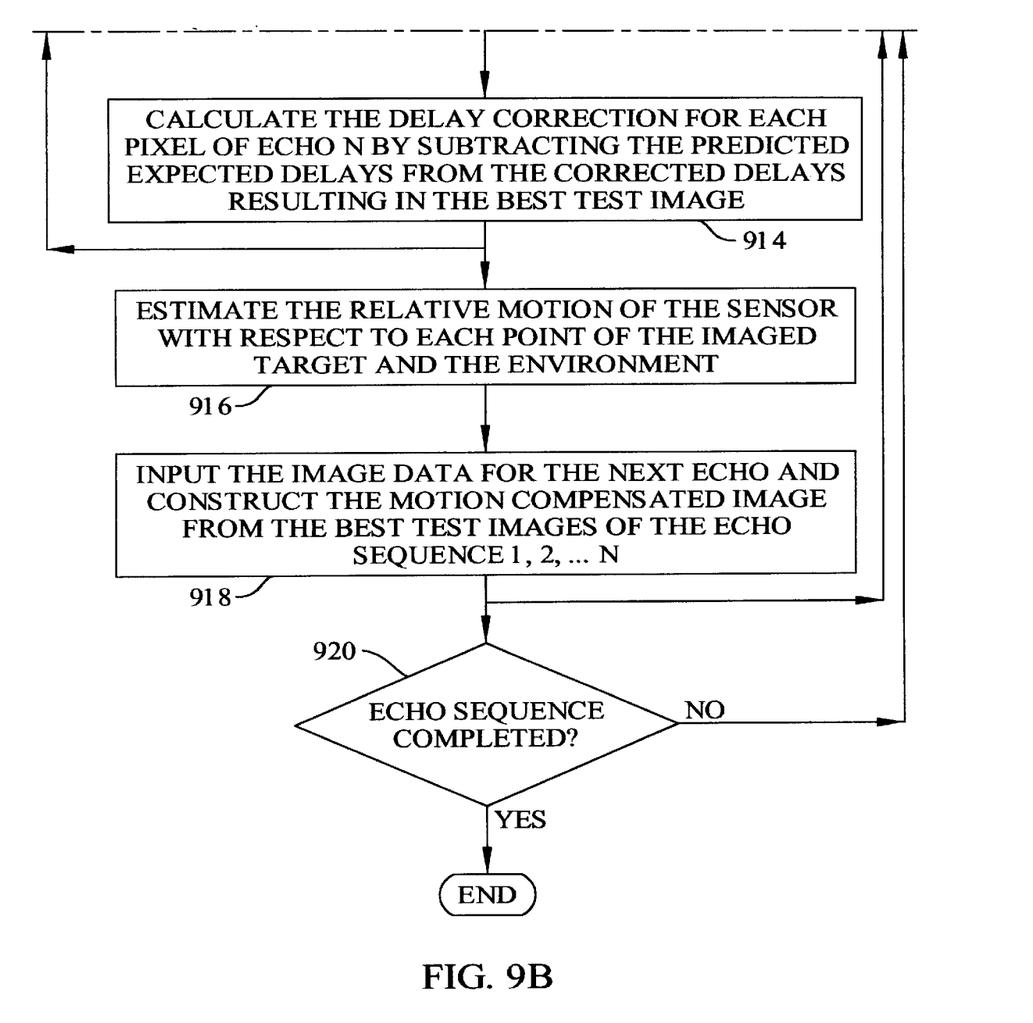

Step 902 inputs delay corrections for the previous echo N.

Step 904 predicts expected delays for echo N from the delay corrections for each image pixel coordinate of echo N.

Step 906 calculates corrections to the expected delays for each image pixel coordinate for echo N from selected possible perturbations.

Step 908 performs delay-and-sum beamforming of image data from the echo sequence 1, 2, . . . N to construct a new test image for each corrected delay at each image pixel coordinate.

Step 910 finds the test image having the largest value of mean square bandwidth for each image pixel and the corresponding delay perturbation at the pixel coordinates resulting in the best local focus.

Step 912 calculates the delay correction for each pixel of echo N by subtracting the predicted expected delays from the delay perturbations resulting in the best test image.

Step 914 estimates the relative motion of the sensor with respect to each point of the imaged target and the environment.

Step 916 constructs the motion compensated image from the best test images of the echo sequence 1, 2, . . . N.

Step 918 checks whether the echo sequence has completed for N echoes. If not, image based tracking continues, otherwise the processor exits.

Step 920 increments the echo number N by 1 for processing the next echo.

Figure 10:
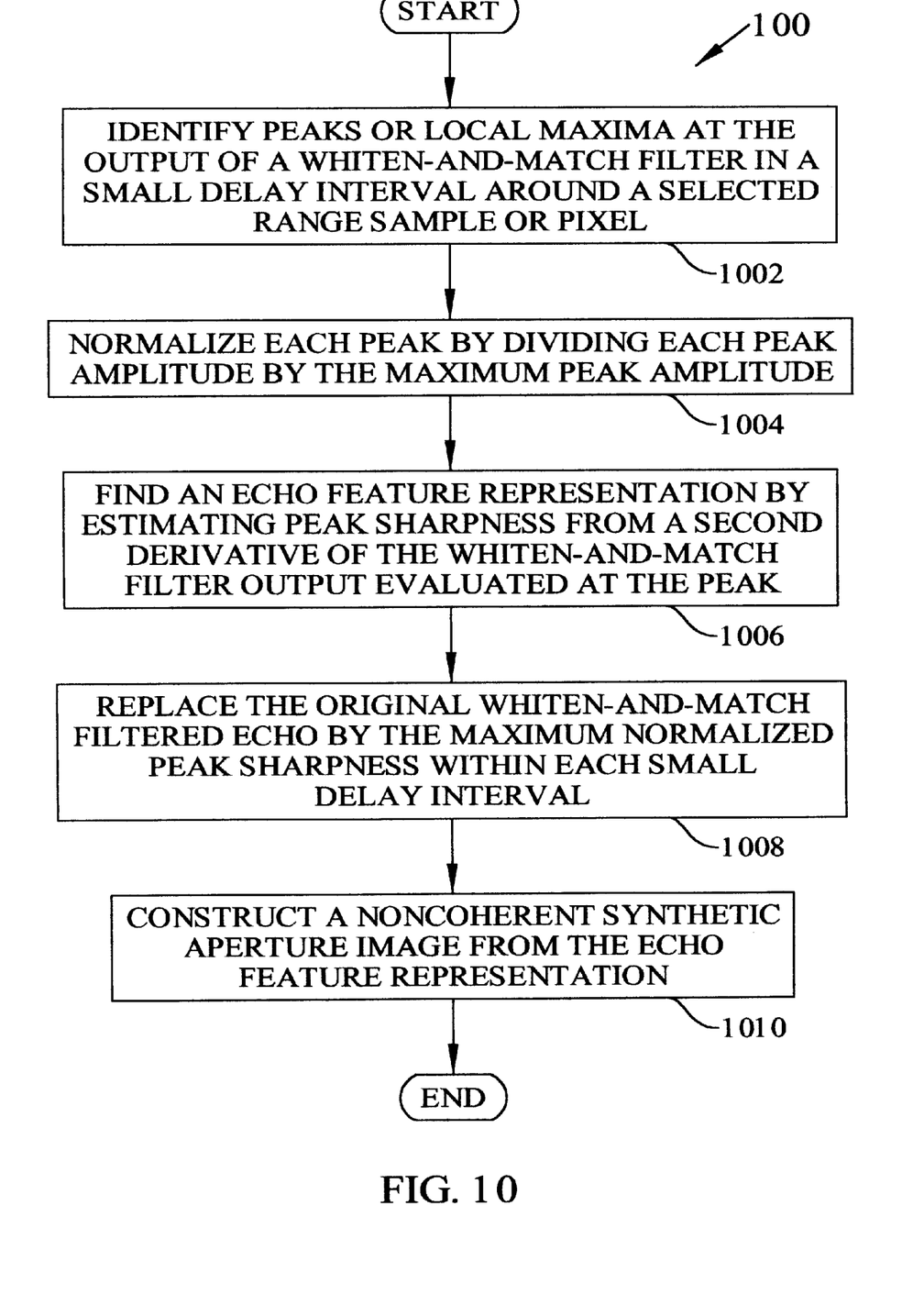
FIG. 10 is a flow chart of a feature imaging technique of the present invention.

Feature images may represent information other than target reflectivity as a function of position. FIG. 10 is a flow chart of a feature imaging technique 100 for accentuating volume clutter (Rayleigh scatterers) and for detecting a low-reflectivity target by the shape of a void formed by the target within the clutter image. Step 1002 identifies peaks or local maxima at the output of a whiten-and-match filter in a small delay interval around a selected range sample or pixel. Step 1004 normalizes each peak by dividing each peak sample by the maximum peak amplitude. Step 1006 finds an echo feature representation by estimating peak sharpness from the second derivative of the whiten-and-match filter output evaluated at the peak. Step 1008 replaces the original whiten-and-match filtered echo by the maximum normalized peak sharpness within each small delay interval. Step 1010 constructs a noncoherent synthetic aperture image from the echo feature representation.

Adaptive focusing may affect SAS images even for small position perturbations. Adaptive focusing yields a different image from the one that is obtained without motion compensation because the target is not planar; different parts of the target lie at different elevations. The algorithm automatically chooses a delay correction that corresponds to the elevation which maximizes the local focus criterion. Adaptive focusing extracts a maximally focused two dimensional image from three dimensional target data. Conventional SAS is restricted to a single range-azimuth plane and lacks the ability to vary elevation for best focus.

In summary, mean square image bandwidth is a measure of the peak-to-sidelobe ratio of the asterisk-shaped point spread function of a synthetic aperture imaging system. This measure may be combined with a dynamic programming approach that evaluates test images to sequentially correct for delay perturbations.

Alternatives to the synthetic aperture feature image and tracking method of the present invention include a state variable model for prediction of position dependent delays and for maneuver estimation from rigid target test images and a radar/sonar analog to a time-warped speech classifier, in which the radar/sonar imaging process evaluates delay corrections in the context of various reference templates.

The synthetic aperture feature image and tracking method of the present invention may be applied to radar/sonar signal processors that can focus on moving targets, to exploit multiple highlights, or scattering centers, in high resolution target trackers for forming a target image that is consistent with apparent changes in highlight locations, and in medical applications for adaptive focusing with ultrasound in non-homogeneous media for tracking and imaging blood flow and heart valves. Methods for seismic geophysical prospecting and acoustic detection of land mines may also benefit from adaptive focusing and feature images.

Other modifications, variations, and applications of the present invention may be made in accordance with the above teachings other than as specifically described to practice the invention within the scope of the following claims.

I claim:

1. A feature imaging and adaptive focusing synthetic aperture process comprising the steps of:

predicting expected echo delays between a sensor and a target for each pixel coordinate of an image representative of the target and its environment formed from echo data;

calculating possible perturbations to the expected echo delays;

beamforming image data of an echo sequence and constructing a test image for each possible or hypothesized echo delay perturbation at each pixel coordinate;

calculating the mean square bandwidth of each test image;

selecting the best test image having the largest value of mean square bandwidth resulting in the best local focus for each image pixel;

subtracting the predicted expected echo delays from the perturbed delays of the best test image for each image pixel;

estimating relative motion of the sensor with respect to each point of the imaged target and its environment;

and constructing a motion compensated image from the best test image of the echo sequence.

2. The feature imaging and adaptive focusing synthetic aperture process of claim 1 wherein the echo data is sonar echo data.

3. The feature imaging and adaptive focusing synthetic aperture process of claim 1 wherein the echo data is radar echo data.

4. A feature imaging and adaptive focusing synthetic aperture process comprising the following steps:

identifying peaks or local maxima at the output of a whiten-and-match filter in a small delay interval around a selected range sample or pixel wherein each peak has a maximum peak amplitude;

normalizing each peak by dividing each peak amplitude by the maximum peak amplitude;

finding an echo feature representation by estimating peak sharpness from a second derivative of the whiten-and-match filter output evaluated at the peak;

replacing the original whiten-and-match filtered echo by the maximum normalized peak sharpness within each small delay interval;

and constructing a noncoherent synthetic aperture image from the echo feature representation.

* * * * *